No. 607,426. Patented July 19, 1898.
W. M. DUCAT.
PURIFYING SEWAGE, &c., BY BACTERIAL ACTION.
(Application filed Oct. 5, 1897.)
(No Model.) 2 Sheets—Sheet 1.
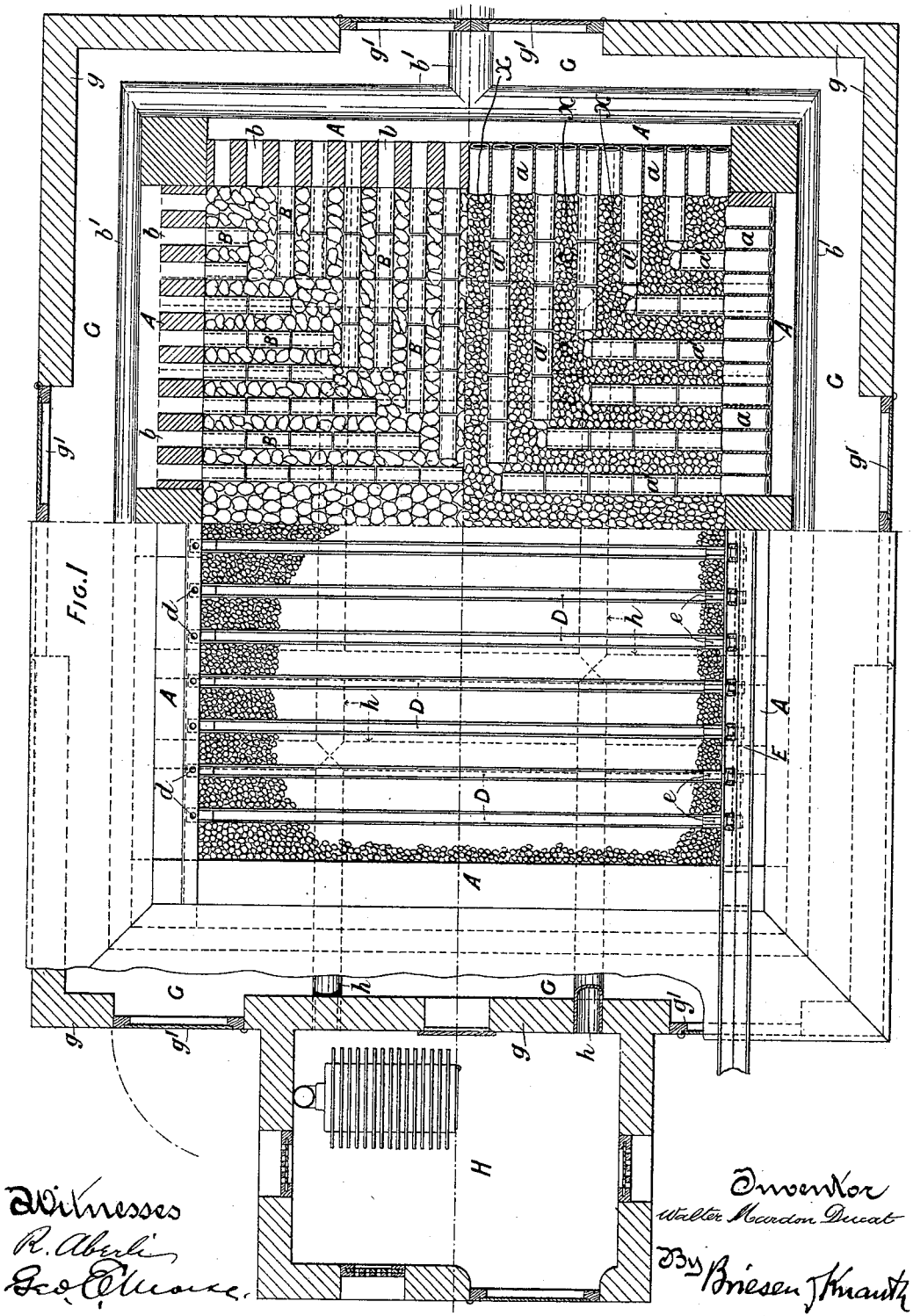

No. 607,426. Patented July 19, 1898.
W. M. DUCAT.
PURIFYING SEWAGE, &c., BY BACTERIAL ACTION.
(Application filed Oct. 5, 1897.)
(No Model.) 2 Sheets—Sheet 2.
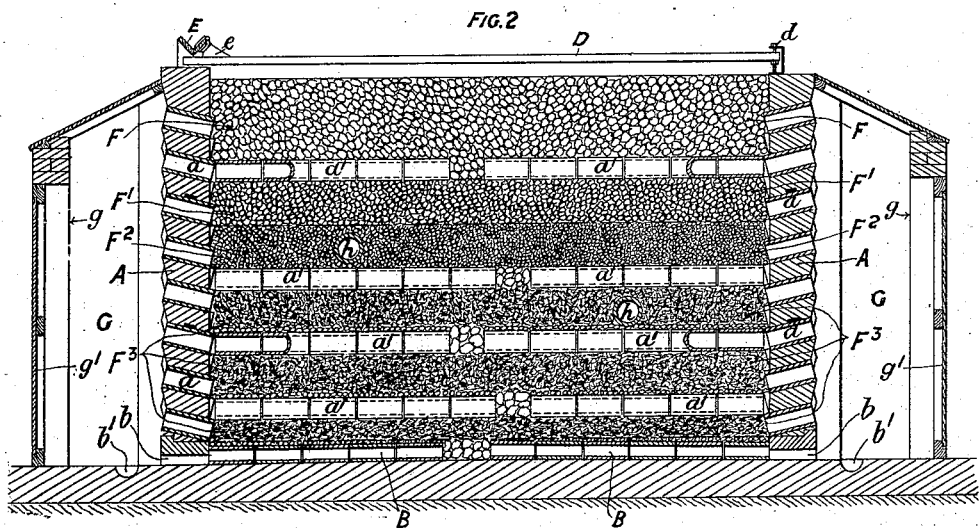
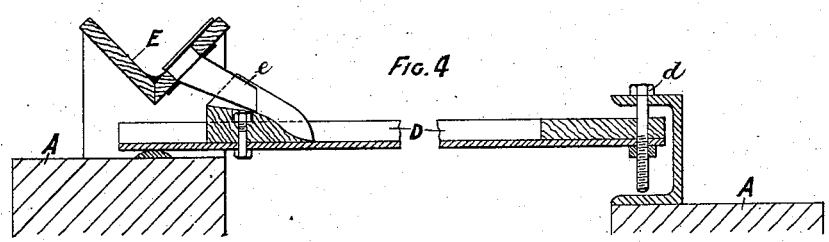
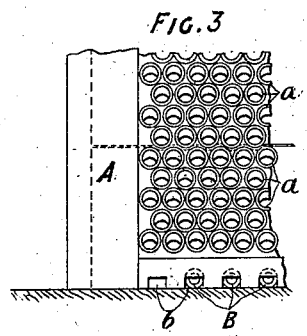
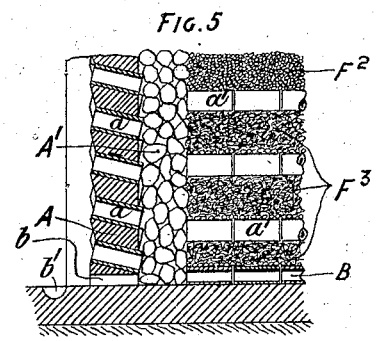
Witnesses
R. Aberli
Geo. E. Morse
Inventor
Walter Mardon Ducat
By Briesen & Knauth
his Attorneys.

UNITED STATES PATENT OFFICE.

WALTER MARDON DUCAT, OF LONDON, ENGLAND.

PURIFYING SEWAGE, &c., BY BACTERIAL ACTION.

SPECIFICATION forming part of Letters Patent No. 607,426, dated July 19, 1898.

Application filed October 9, 1897. Serial No. 654,110. (No model.) Patented in France May 18, 1897, No. 267,048, and in Belgium May 19, 1897, No. 128,347.

*To all whom it may concern:*

Be it known that I, WALTER MARDON DUCAT, colonel late Royal Engineers, of 13 Devonshire Terrace, Hyde Park, London, W., England, have invented new and useful Improvements in and Connected with the Purification of Sewage or other Foul Liquids by Bacterial Action, (for which I have obtained Letters Patent in the following countries, viz: Belgium, dated May 19, 1897, No. 128,347, and France, dated May 18, 1897, No. 267,048,) of which the following is a full, clear, and exact description.

This invention relates, essentially, to the purification of sewage and other foul liquids by bacterial action, but is applicable to the purification of water generally; and it has for its object, first, to insure the continuous aeration by natural means of the filter-bed throughout its mass, whereby bacterial action will be rendered more effective for the purpose of "nitrification," and consequently the process of purification will be accelerated and greater purity of the effluent will be obtained.

The invention has for its object, secondly, to prevent the efficiency of the filter being diminished by exposure to cold winds or the process of purification being interrupted by frost, which would cause the cessation of bacterial action.

Heretofore filter-beds have usually been submerged or covered with the liquid to be purified, so that while the filter was in operation access of air to and into the filter-bed was not possible, such access of air being only possible during the periods of rest when the system of intermittent filtration was adopted, and as the surface only of the filter-bed was exposed to the air long periods of rest were required, during which periods the filter was of course standing idle. The superficial aeration thus obtainable was insufficient to maintain the bacteriological efficiency on which the purifying action is found to depend, it having been discovered that for the purification of sewage and other foul liquids a high degree of aeration is necessary to supply the oxygen required, the filter-bed having for its principal function to act not as a mechanical strainer, but as the nidus for the microbes by which the organic impurities are destroyed.

According to my invention the continuous aeration of the filter-bed throughout its whole mass is insured by natural means and in such a manner that the aeration is directly brought about by the working of the filter itself, so that the aeration, being entirely independent of adventitious aid, is rendered continuous, and the efficiency of the purifying action is so complete that the working of the filter may be continued for an indefinite period without intermission, the whole of the solid matters suspended in the sewage being disposed of by bacterial action, so that no renewal or cleaning is required. This result is attained by providing for the continuous penetration of the ambient air into the midst of the mass of the filter-bed, the penetration of the air into the interstices being produced by the exhaustive action due partly to the vacuum produced by the absorption and entry into combination with organic matter of the oxygen of the air and partly to the motion of the liquid between the particles, this exhaustive action being rendered constant by so regulating the rate of supply of the liquid to be purified relatively to the rate of flow through the filter-bed that the latter shall never be fully charged with liquid, and consequently shall never be submerged. The maintenance of the bacterial action during cold weather is provided for by inclosing the filter in an outer air-chamber, so as to screen it from cold winds, and by supplying to this chamber from which the air for aerating the mass is drawn air which has been previously warmed either by the internal action of the filter itself or by an external source of heat.

The invention will be described with reference to the accompanying drawings, forming part of this specification, wherein—

Figure 1 is a half-plan and half-horizontal section of a filter, the section being taken on two different planes. Fig. 2 is a vertical section of the filter. Fig. 3 is a part elevation of one of the apertured walls. Fig. 4 is an enlarged sectional detail view of one of the sewage-supply troughs. Fig. 5 is a part vertical section showing a modified construction of the means of aerating the beds by lateral admission of air.

The walls A of the filter are apertured or constructed of open-work, such as honeycombed brickwork, or, preferably, of superposed rows of earthenware pipes a, laid in cement, the walls thus openly constructed throughout their whole length and height being erected between pillars of solid brickwork. The pipes a extend, preferably, in a downwardly-inclined direction from the outside to the inside of the wall, so as, while confining the filter-bed, to afford the most ample access possible for the ambient air thereto, the filter-bed being practically exposed to the air over almost the whole area of its four sides as well as over its upper surface. In order to provide for the penetration of the air into the midst of the mass of the filter-bed, strata of very coarse material are interposed between the adjacent strata x of finer material, and in these very coarse strata there may be laid pipes $a'$, forming open-jointed continuations of certain of the air-inlet pipes a. At the bottom of the filter is a drainage layer of large pebbles, in which are laid open-jointed pipes B, leading to outlets b in the walls A, discharging into a gutter $b'$, by which the effluent is carried away.

In order to produce the exhaustive action by which the air is caused to be drawn into the mass of the filter, the liquid to be purified is supplied to the filter-bed in as uniformly-distributed a form as possible and at such a rate compared with the rate of flow through the mass that the surface of the bed is never submerged, and the mass is never saturated to such an extent that there is any head of liquid-pressure in the chamber nor any tendency of the liquid to run out until it reaches the discharge-apertures b at the bottom of the chamber. The distribution of the sewage to the filter may be effected by allowing it to overflow the sides of troughs D, extending across the filter-bed and supplied through spouts e from a main trough E, the troughs D being provided with means of adjustment d at one end, whereby they may be brought so nearly horizontal that the overflow from the troughs D will be as nearly as possible uniform over their whole length.

By supplying the liquid to the filter in limited quantity it becomes possible to so distribute the liquid in the filter-beds that the said liquid will run over the individual bodies constituting a filter-bed in a thin film, by which mode of procedure the water is very finely divided, and as the air has free access around the said bodies the liquid is very fully exposed to the action of the said air.

The filter-bed is formed of strata progressively graduated from the uppermost and coarsest stratum F to the lowermost and finest stratum $F^3$. The uppermost stratum F is composed, preferably, of coke or cinders or other material—such as pumice-stone, burnt ballast, or gravel, for instance—say of about one cubic inch in size and about two feet thick. The intermediate strata $F'$ $F^2$ are respectively of, say, half an inch and a quarter of an inch coke, and the bottom stratum $F^3$ is of, say, one-eighth of an inch coke. Although these dimensions are indicated as suitable for purifying sewage, I would have it understood that they are in no way obligatory and may be varied according to circumstances, the thickness of the strata and the depth of the filter depending on the impurity of the sewage and the degree of purification required, the essential feature being that the uppermost stratum is the coarsest and is composed of pieces of such large dimensions as to leave interstitial spaces sufficiently large to enable the sludge or solid matters of the sewage to penetrate the mass of the upper stratum and to be there broken down and disposed of by bacterial action without liability of the filter ever becoming choked with solid matter. By graduating the various strata progressively from very coarse at the upper part to finer toward the lower part the interstitial spaces (which are proportional to the degree of coarseness of the material) are in such relation to the amount of solid matter suspended in the liquid passing through them as to insure a degree of aeration at all parts of the filter adequate to maintain the bacterial action necessary to enable the solid matters to be rapidly and effectually disposed of.

Instead of or in addition to the walls of the filter-chamber being apertured the lateral aeration of the filter-bed might be provided for by interposing between the walls and the filter-bed a vertical stratum or lining-wall $A'$, Fig. 5, of such very coarse lumps of material that the air will have free passage between them from above, the liquid being distributed only over the surface of the filter-bed proper, and that at such a limited rate that there is never any head of pressure within the filter-bed. Air-tubes $a'$ may extend from this air-inlet wall through coarse intermediate strata, as before. As, however, the tubular or apertured construction of the walls before described is sufficient for the purpose and as the interposition of the coarse lining-wall $A'$ would uselessly extend the superficial dimensions of the structure, it would not be generally adopted and is only indicated here as a possible modification.

In order to protect the filter-bed from cold and maintain the temperature of the mass uniform and above, say, 40° Fahrenheit, the walls of the filter are surrounded by an air-chamber G, inclosed within solid walls g and a roof, large doors $g'$ being provided in the walls g for admission of air in warm weather, which doors are closed when the external temperature falls below a certain point. Adjoining one of the outer walls g is a chamber H, communicating with the external air and connected with the air-chamber G by one or more pipes h, passing horizontally through the mass of the filter-bed, so that when the external temperature is not so low as to necessitate recourse to artificial heat the air will be supplied to the air-chamber only through these pipes and will become warmed by the heat generated within the mass of the filter-bed by the action of the filter. The superfluous internal heat is thus utilized to raise the temperature of the fresh air entering the air-chamber and passing thence through the apertured walls A, whereby the temperature of the whole mass is maintained uniform and excessive cooling of the lateral portions by incoming cold air is prevented. In long-continued severe frosts, however, a stove in the chamber H must be used to raise the temperature of the air before its admission to the air-chamber, so that air at the proper temperature will be supplied to the filter through its perforated sides.

As above mentioned, the scope of the invention is not limited to the treatment of sewage, which is only cited by way of example, the invention being equally applicable for the purification of river and other water contaminated with organic impurities, the object of the treatment being to render such water fit for drinking.

Having now particularly described and ascertained the nature of my said invention and in what manner the same is to be performed, I declare that what I claim is—

1. The herein-described method of insuring the continuous aeration of a filter used for purifying sewage and other foul liquids by bacterial action, which consists in admitting ambient air through the sides, and into the midst, of the filter-bed supplying liquid to the bed and causing the same to flow through the bed and so limiting the supply of liquid to the filter that the filter-bed will never be fully charged with liquid and the motion of the liquid through the bed and consumption of the oxygen of the air will produce an exhaustive action whereby the air will be continuously drawn into the mass through the sides of the mass as described.

2. The herein-described method of insuring the efficient aeration of foul liquids while traversing the mass of filter-beds used to purify the said foul liquids consisting in supplying the foul liquid to the filter-beds in such quantity as to spread the said liquid out in a film on the surfaces of the individual bodies constituting the filter-bed and simultaneously supplying air to the sides of the said filter-beds whereby the flow of the liquid will cause a circulation of air around the said bodies constituting the said filter-bed, whereby the foul liquid may be efficiently acted upon by the air while in a finely-divided condition.

3. A filter for purifying sewage and other foul waters by bacterial action having one or more filter-beds confined by walls of an openwork structure adapted to confine the filter-bed while giving free continuous lateral admission of air into the midst of the filter-bed, substantially as and for the purpose specified.

4. A filter for purifying sewage and other foul waters by bacterial action, having walls adapted to give free continuous admission of air into the midst of the filter-bed, in combination with a contained bed of filtering material divided into superposed strata graduated of progressively-decreasing coarseness in the downward direction substantially as and for the purpose specified.

5. A filter for purifying sewage and other foul waters by bacterial action, having walls adapted to allow free continuous admission of air into the midst of the filter-bed in combination with a contained bed of filtering material divided into superposed strata of progressively-decreasing coarseness by intervening aerating strata of very coarse material substantially as specified.

6. A filter for purifying sewage and other foul waters by bacterial action having walls adapted to allow free continuous admission of air into the midst of the filter-bed in combination with a contained bed of filtering material divided into superposed strata of progressively-decreasing coarseness by intervening strata of very coarse material having aerating-pipes laid therein forming continuations of the lateral air-inlet passages as specified.

7. A filter for purifying sewage and other foul waters by bacterial action, having walls adapted to allow admission of air to the contained filter-bed, and surrounded by an outer inclosing air-chamber so as to exclude cold air and enable the temperature of the air to be raised before being supplied to the filter.

8. The combination, with a filter for purifying sewage and other foul waters by bacterial action having walls adapted to allow admission of air to the contained filter-bed, and surrounded by an outer inclosing air-chamber, of air-admission pipes passing through the mass of the filter-bed and leading into said air-chamber so that the air before being admitted to said chamber will be warmed by the superfluous internal heat of the filter as described.

WALTER MARDON DUCAT.

In presence of—
E. S. BROWNE,
J. CONWAY.